US011559741B2

(12) United States Patent
Kumar et al.

(10) Patent No.: US 11,559,741 B2
(45) Date of Patent: *Jan. 24, 2023

(54) SYSTEMS AND METHODS TO PROVIDE AUDIBLE OUTPUT BASED ON SECTION OF CONTENT BEING PRESENTED

(71) Applicant: Sony Interactive Entertainment Inc., Tokyo (JP)

(72) Inventors: Saket Kumar, San Mateo, CA (US); Komath Naveen Kumar, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,791

(22) Filed: Apr. 22, 2020

(65) Prior Publication Data

US 2020/0246702 A1  Aug. 6, 2020

Related U.S. Application Data

(63) Continuation of application No. 16/018,705, filed on Jun. 26, 2018, now Pat. No. 10,661,173.

(51) Int. Cl.
| | |
|---|---|
| *A63F 13/00* | (2014.01) |
| *A63F 9/24* | (2006.01) |
| *A63F 13/54* | (2014.01) |
| *A63F 13/424* | (2014.01) |
| *G10L 15/22* | (2006.01) |
| *G10L 15/18* | (2013.01) |
| *A63F 13/215* | (2014.01) |
| *G10L 25/63* | (2013.01) |

(52) U.S. Cl.
CPC ............ *A63F 13/54* (2014.09); *A63F 13/215* (2014.09); *A63F 13/424* (2014.09); *G10L 15/1815* (2013.01); *G10L 15/22* (2013.01); *G10L 25/63* (2013.01); *G10L 2015/223* (2013.01)

(58) Field of Classification Search
CPC ...... A63F 13/215; A63F 13/424; A63F 13/54; G06T 15/1815; G06T 15/22; G10L 25/63
See application file for complete search history.

(56) References Cited

U.S. PATENT DOCUMENTS

| | | | |
|---|---|---|---|
| 4,729,563 A | 3/1988 | Yokoi | |
| 4,844,475 A | 7/1989 | Saffer et al. | |
| 6,609,976 B1 | 8/2003 | Yamagishi et al. | |
| 6,733,360 B2 | 5/2004 | Dooley et al. | |
| 6,773,344 B1 | 8/2004 | Gabai et al. | |
| 6,973,620 B2 * | 12/2005 | Gusler | G06F 9/453 |
| | | | 715/708 |
| 8,042,045 B1 * | 10/2011 | Sullivan | A63F 13/5375 |
| | | | 715/708 |
| 8,753,183 B2 | 6/2014 | Davison et al. | |
| 10,661,173 B2 * | 5/2020 | Kumar | A63F 13/215 |
| 2002/0023144 A1 | 2/2002 | Linyard et al. | |
| 2005/0246638 A1 | 11/2005 | Whitten | |
| 2006/0223637 A1 | 10/2006 | Rosenberg | |
| 2008/0266250 A1 * | 10/2008 | Jacob | A63F 13/67 |
| | | | 345/156 |

(Continued)

*Primary Examiner* — Milap Shah
(74) *Attorney, Agent, or Firm* — John L. Rogitz

(57) ABSTRACT

A device provides audible output pertaining to audio video (AV) content such as a video game based on a section of the AV content that is being presented.

12 Claims, 7 Drawing Sheets

(56) References Cited

U.S. PATENT DOCUMENTS

| | | | |
|---|---|---|---|
| 2009/0209337 A1* | 8/2009 | Vrignaud | A63F 13/85 463/31 |
| 2010/0058065 A1 | 3/2010 | Celik et al. | |
| 2010/0121808 A1 | 5/2010 | Kuhn | |
| 2011/0281648 A1* | 11/2011 | Weising | A63F 13/85 463/32 |
| 2012/0136737 A1 | 5/2012 | Lippolis | |
| 2012/0302336 A1 | 11/2012 | Garza et al. | |
| 2013/0005471 A1 | 1/2013 | Chung et al. | |
| 2013/0225296 A1* | 8/2013 | Kim | A63F 13/537 463/37 |
| 2014/0011428 A1 | 1/2014 | Barthold | |
| 2014/0100040 A1 | 4/2014 | Chung et al. | |
| 2014/0274353 A1* | 9/2014 | Benson | G06F 3/01 463/29 |
| 2015/0242504 A1* | 8/2015 | Profitt | G06F 9/453 707/767 |
| 2016/0154656 A1* | 6/2016 | Illindala | G06F 16/3329 715/708 |
| 2017/0270128 A1* | 9/2017 | Smith | G06F 16/9535 |
| 2017/0354883 A1 | 12/2017 | Benedetto et al. | |
| 2017/0354892 A1 | 12/2017 | Benedetto et al. | |
| 2017/0354893 A1 | 12/2017 | Benedetto et al. | |
| 2018/0280802 A1* | 10/2018 | Stroud | A63F 13/63 |
| 2019/0232168 A1 | 8/2019 | Benedetto et al. | |
| 2019/0232169 A1 | 8/2019 | Benedetto et al. | |

* cited by examiner

SYSTEMS AND METHODS TO PROVIDE AUDIBLE OUTPUT BASED ON SECTION OF CONTENT BEING PRESENTED

FIELD

The application relates generally to technically inventive, non-routine solutions that are necessarily rooted in computer technology and that produce concrete technical improvements.

BACKGROUND

Video games are a fun and engaging source of entertainment for many people.

However, playing video games can sometimes be frustrating to a user if the user cannot complete a certain objective within the video game or is having trouble even identifying the objective to complete. There are currently no adequate solutions to the foregoing computer-related, technological problem.

SUMMARY

Accordingly, in one aspect a device includes at least one processor and at least one computer storage with instructions executable by the at least one processor. The instructions are executable to identify a location within audio video (AV) content that is currently being presented and to provide, based on the identification of the location within the AV content, audible assistance pertaining to the AV content.

In some implementations, the AV content may include a video game, and the location may be a chapter or sub-chapter of the video game. The location may be identified based at least in part on images from a camera in communication with the at least one processor, with the images from the camera indicating a portion of the AV content.

Also, in some embodiments the audible assistance may be first audible assistance, the location may be a first location, and the instructions may be executable by the at least one processor to provide the first audible assistance based on the identification of the first location meeting a threshold confidence level and to decline to provide second audible assistance based on identification of a second location within the AV content not meeting the threshold confidence level.

The content of the audible assistance may vary based on a level of confidence in the identification of the location. For example, the content of the audible assistance may be tailored to pertain to the location based on the level of confidence in the identification of the location being above a threshold confidence level and may not be tailored to pertain to the location based on the level of confidence in the identification of the location being below the threshold confidence level.

In some implementations the content of the audible assistance may be determined based on execution of natural language processing on speech received from a user to identify information relevant to what is spoken by the user. Additionally or alternatively, the content of the audible assistance may be tailored to a user's emotion(s) while observing the AV content.

In examples where the AV content is a video game, the content of the audible assistance may even be tailored to one or more of a player's gameplay ability and a difficulty level at which the video game is set. Additionally or alternatively, the content of the audible assistance may vary based on an objective of a player of the video game, where the objective may pertain to one or more of a game score, a player rating, and a level of engagement with various aspects of the video game.

In some embodiments, the device may be a first device established by a robot, with the robot being different from a second device at which the AV content is presented. Also in some embodiments, the device may be embodied in a video game console or another device that communicates with the video game console to identify the location.

In another aspect, a computer-implemented method includes identifying a section of content that is currently being presented via at least one device and providing, based on the section of the content that is currently being presented, audible assistance pertaining to the section.

In still another aspect, an apparatus includes at least one computer memory that includes instructions executable by at least one processor to identify a section of a video game that is currently being presented via a device and to provide, based on the section of the video game that is currently being presented, audible assistance pertaining to the video game.

The details of the present application, both as to its structure and operation, can best be understood in reference to the accompanying drawings, in which like reference numerals refer to like parts, and in which:

DETAILED DESCRIPTION

Figure 1:
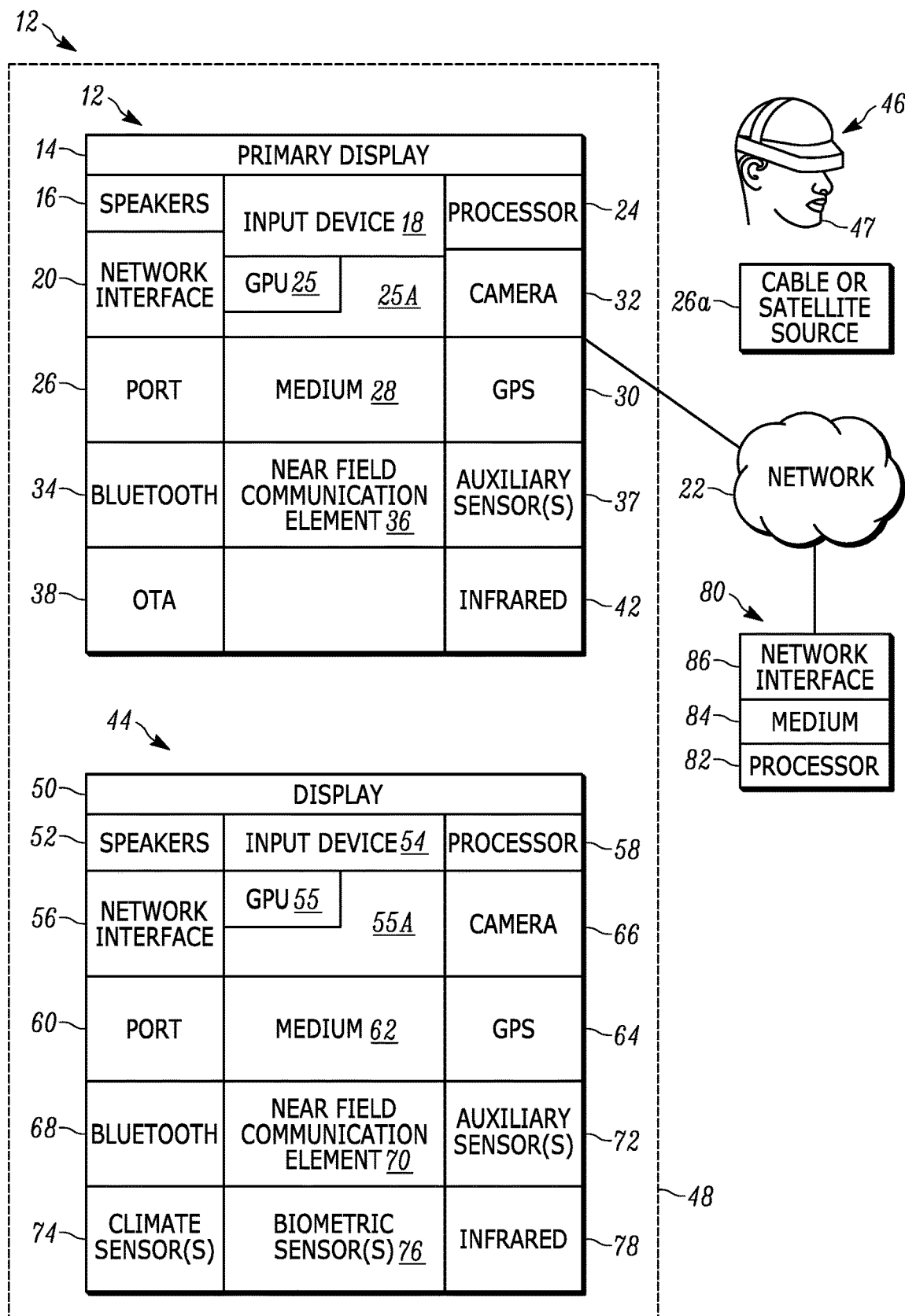
FIG. 1 is a block diagram of an example system consistent with present principles.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, to illustrate present principles all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., digital or game assistant applications as disclosed herein. Additionally or alternatively, the server 80 may be implemented by one or more game consoles or other computers in the same room as the other devices shown in FIG. 1 or nearby.

Figure 2:
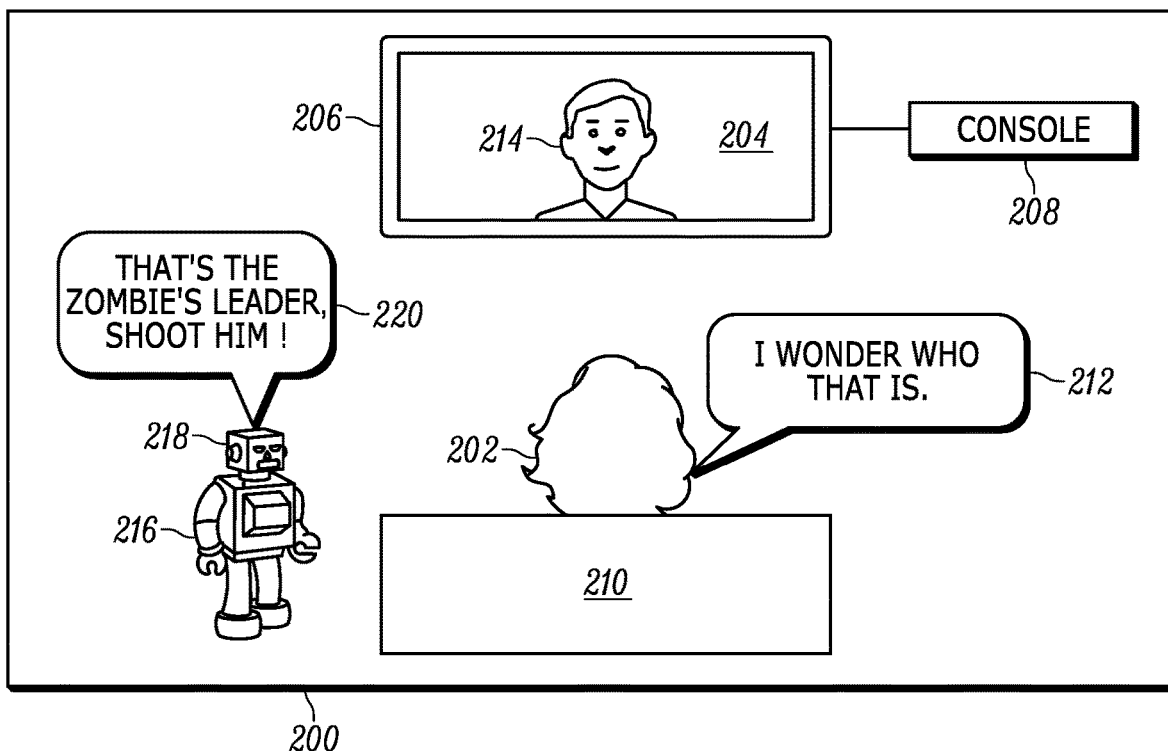
FIGS. 2-7 are example illustrations consistent with present principles.

Now in reference to FIG. 2, it shows an example illustration 200 in accordance with present principles. It shows a player 202 of a video game 204 that is being presented on an audio video device (AVD) 206 such as a television under control of a video game console 208. The player 202 is shown sitting on a couch 210, with the player understood to be using a video game controller to play the video game 204, though not shown from the angle behind the player 202 that is depicted in the illustration.

As shown by speech bubble 212, the player 202 speaks "I wonder who that is" to himself or herself in relation to a zombie 214 that is presented as part of the video game 204. A stand-alone autonomous robot 216 is also shown, with the robot 216 understood to be executing a digital assistant application to receive the speech through a microphone disposed on the robot 216 and to execute natural language processing on the speech to identify information useful in generating audible assistance to the player 202.

Also in order to provide relevant audible assistance, the robot 216 actuates its camera 218 to gather one or more images of the video game 204 as presented on the AVD 206 to identify the zombie 214 using object recognition and/or a comparison to pre-stored images of characters of the video game 204 to which the robot 216 has access.

Then, based on the zombie 214 being identified (as well as based on other potential identifications such as the zombie 214 being the only video game object in the foreground of the segment of video game currently being played or being the only video game character fighting the user's own video game character), the robot 216 may identify the subject being referenced by the user in the user's natural language speech. In response, the robot 216 may provide audible assistance that is tailored to the user's natural language speech, which in this case is to identify the zombie 214 as the zombie leader and telling the player 202 to shoot the zombie 214, as represented by speech bubble 220. Additionally, though not shown in FIG. 2 it is to be understood that the robot 216 may provide visual assistance as well, such as activating a laser pointer on the robot 216 and directing laser light toward the zombie 214 as presented on display of the AVD 206 to provide a visual aid of what the robot 216 is referencing via its audible assistance.

Note that in some instances, the robot 216 may not be able to particularly identify the zombie 214 as the zombie leader to a threshold level of confidence if, for example, the zombie 214 as identified using object recognition might potentially match more than one reference video game character in data to which the robot 216 has access, or if a sunlight glare on the display of the AVD 204 results in the robot 216 only being able to "see" part of the zombie 214 using its camera. An alternative example to FIG. 2 is shown in the illustration 300 of FIG. 3 and demonstrates this.

Figure 3:
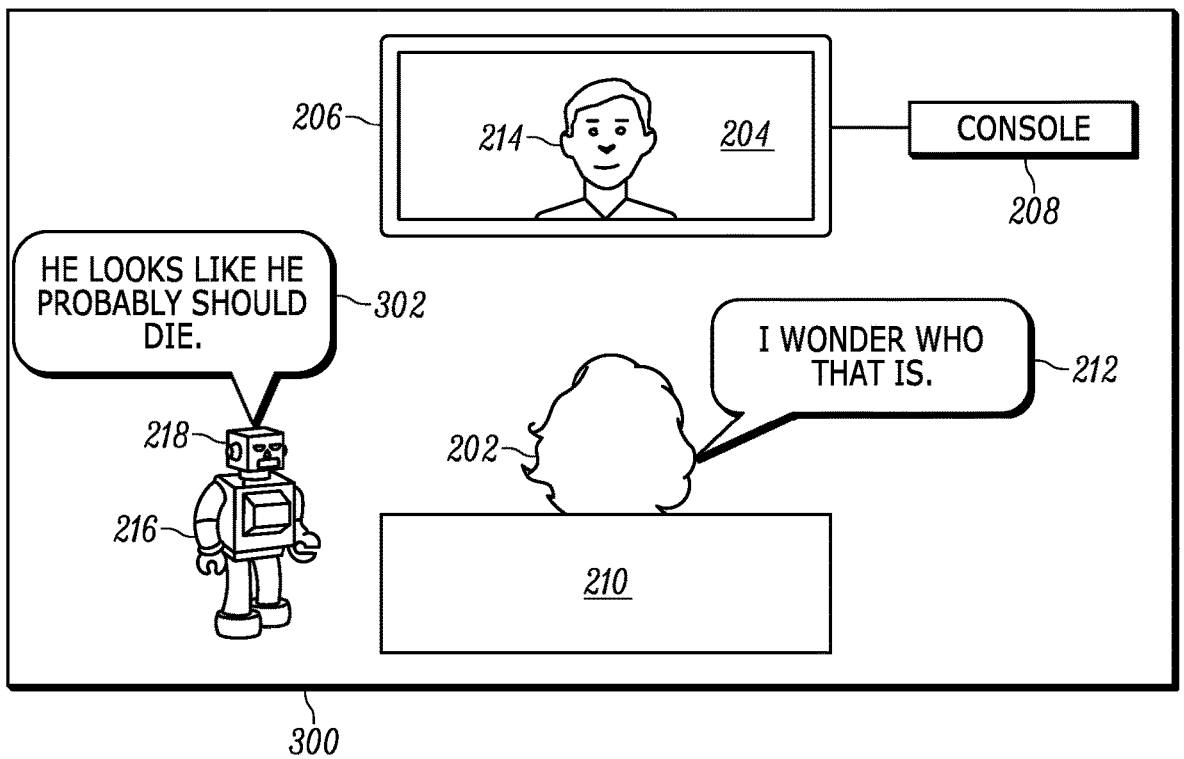

As shown in FIG. 3, owing to the threshold level of confidence not being met, the robot 218 may give more-general audible assistance to the player 202 that does not identify the zombie 214 as the zombie leader in particular. However, if the robot 216 were still able to identify the zombie 214 as a zombie of some kind, and based on the robot 216 having access to data indicating that all zombies in the video game 204 should be targeted and killed, the robot 216 may still provide some audible assistance that is tailored to the natural language speech of the player 202. In this case, the audible assistance from the robot 216 still references the zombie 214 as identified as the subject of the natural language speech but in this case indicates that the zombie 214 "looks like he probably should die" even though the robot 216 does not indicate the role of the zombie 214 as the zombie leader.

Figure 4:
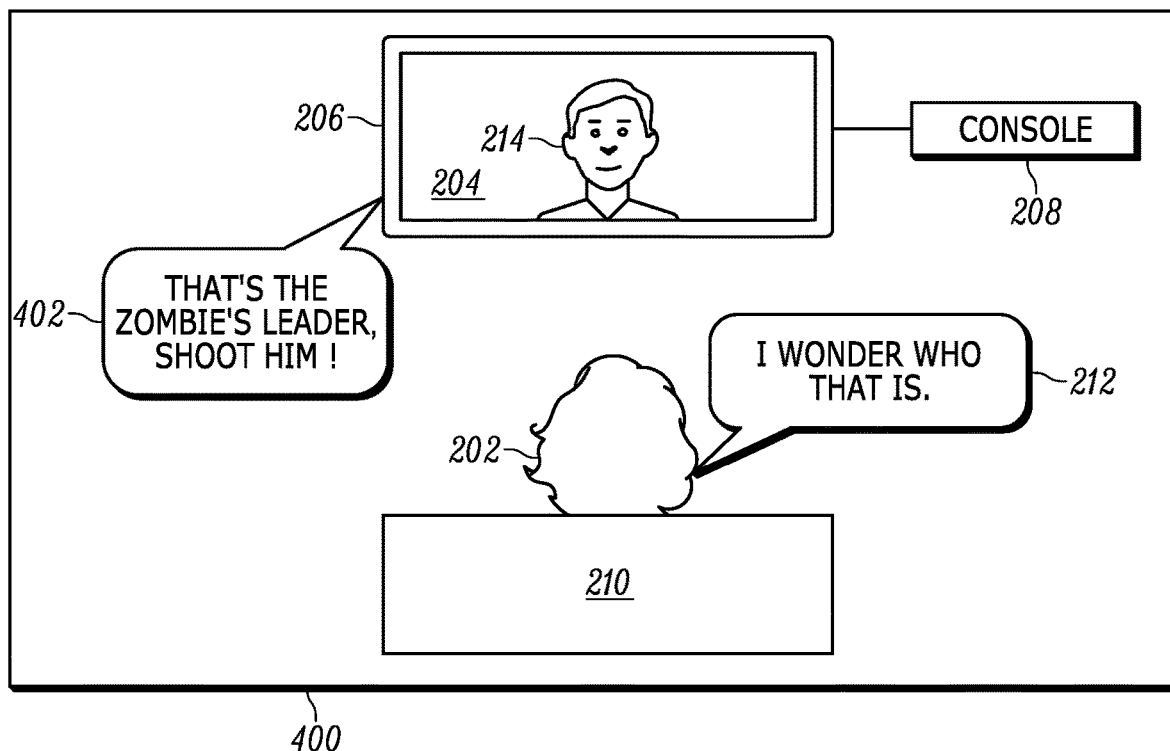

FIG. 4 shows yet another example. In the illustration 400 that is shown, the player 202 again speaks to himself or herself, wondering "who that is" as again represented by speech bubble 212. But differentiating FIG. 4 from FIG. 2, no robot is present here and an audible/digital assistant application for providing audible assistance is instead running on the AVD 206, console 208, or another device in communication with either of those devices such as the user's smart phone. Based on the speech being detected using a microphone also located on one of those devices or elsewhere within the player's environment, and based on images from a camera positioned on one of those devices or elsewhere within the environment to gather images of the display of the AVD 206, the same type of process(es) described above may be executed by the AVD 206, console 208, and/or other device rather than by the robot 216. Accordingly, speech bubble 402 indicates that speakers on the AVD 206 may be used to provide the same audible assistance the robot 216 had provided in the example shown in FIG. 2.

Figure 5:
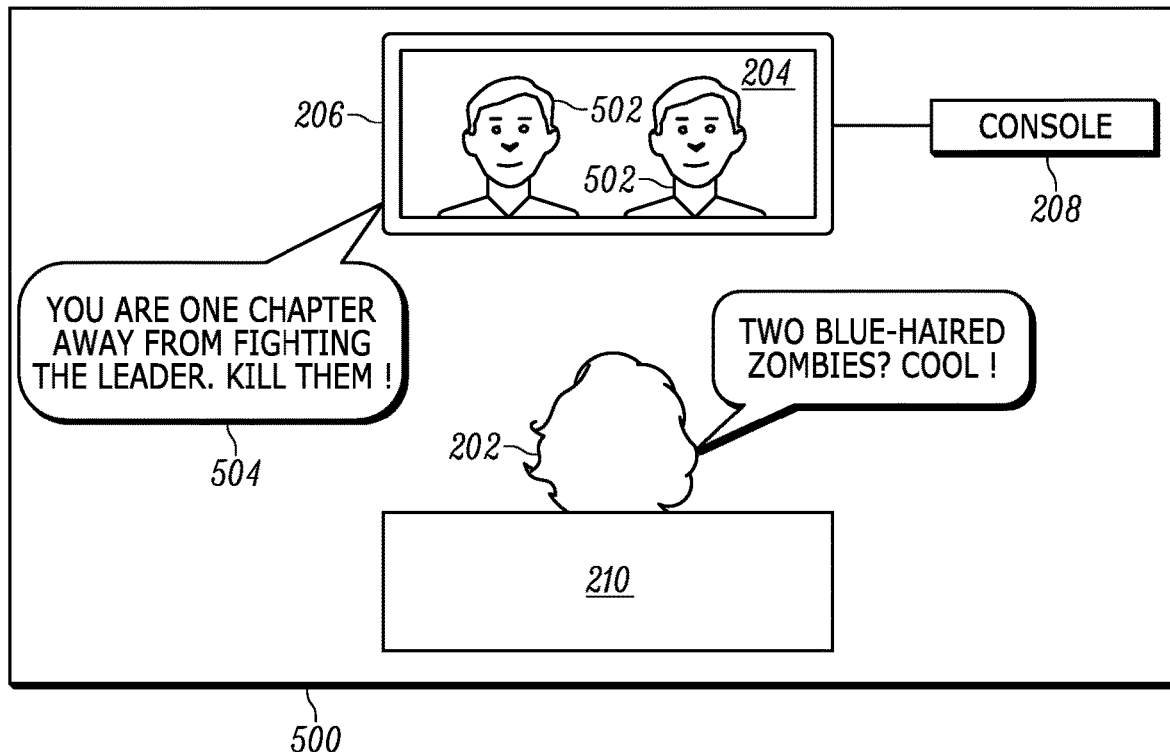

FIG. 5 shows another example embodiment like FIG. 4 in which a "virtual" audible/digital assistant may be used rather than a separate, stand-alone autonomous robot. As shown in the illustration 500, a different scene, chapter, or sub-chapter from the video game 204 is being presented via the AVD 206. In this example, the different scene/chapter depicts two blue-haired zombies 502, which prompts the player 202 to exclaim, "Two blue-haired zombies? Cool!" By processing this natural language, the audible assistant application being executed by one of the devices within the user's environment may identify "blue haired zombies" as the subject of the speech and look up data to which it has access that indicates which video game chapter/sub-chapter the blue-haired zombies are encountered in the video game. The data itself may be accessed as stored remotely on a server by, e.g., a manufacturer of the console 208 or producer of the game 204. However, crowd-sourced data may also be used in addition to or in lieu of the foregoing.

In any case, in the example shown in FIG. 5 the blue-haired zombies are identified as encountered in the penultimate chapter of the video game. Then, based on the audible assistant application matching blue-haired zombies to the penultimate chapter, the application may provide audible assistance to the player 202 that is tailored to encourage the player 202. In this case, the audible assistance indicates that the player 202 is one chapter away from fighting the zombie leader at the end of the video game and also encourages the player 202 to kill the blue-haired zombies to get to the final chapter, as represented by speech bubble 504.

Figure 6:
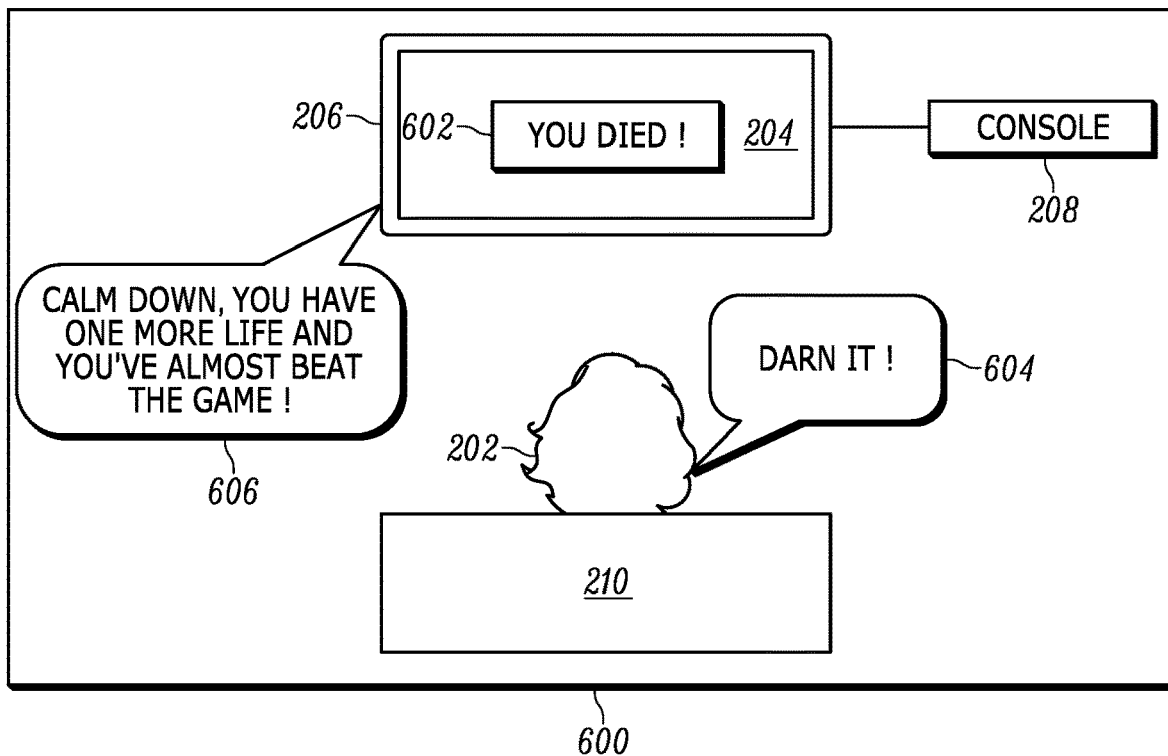

FIG. 6 shows yet another example illustration 600 in accordance with present principles. In illustration 600 the video game 204 is shown as presenting a "You died!" message 602 based on the character being played by the player 202 dying in the video game 204. In response to the message 602, the player exclaims "Darn it!" as represented by speech bubble 604. In turn, the assistant application executing at the console, smart phone, etc. picks up on this natural language and processes it to identify an emotion of the user using emotion recognition software or a relational database associating various exclamations with certain respective emotions. Once an emotion has been identified (in this example, frustration), the assistant application may tailor audible output to counteract the emotion. In this case, audible output is generated to assuage the player 202 by indicating, "Calm down, you have one more life and you've almost beat the game!", as represented by speech bubble 606.

Figure 7:
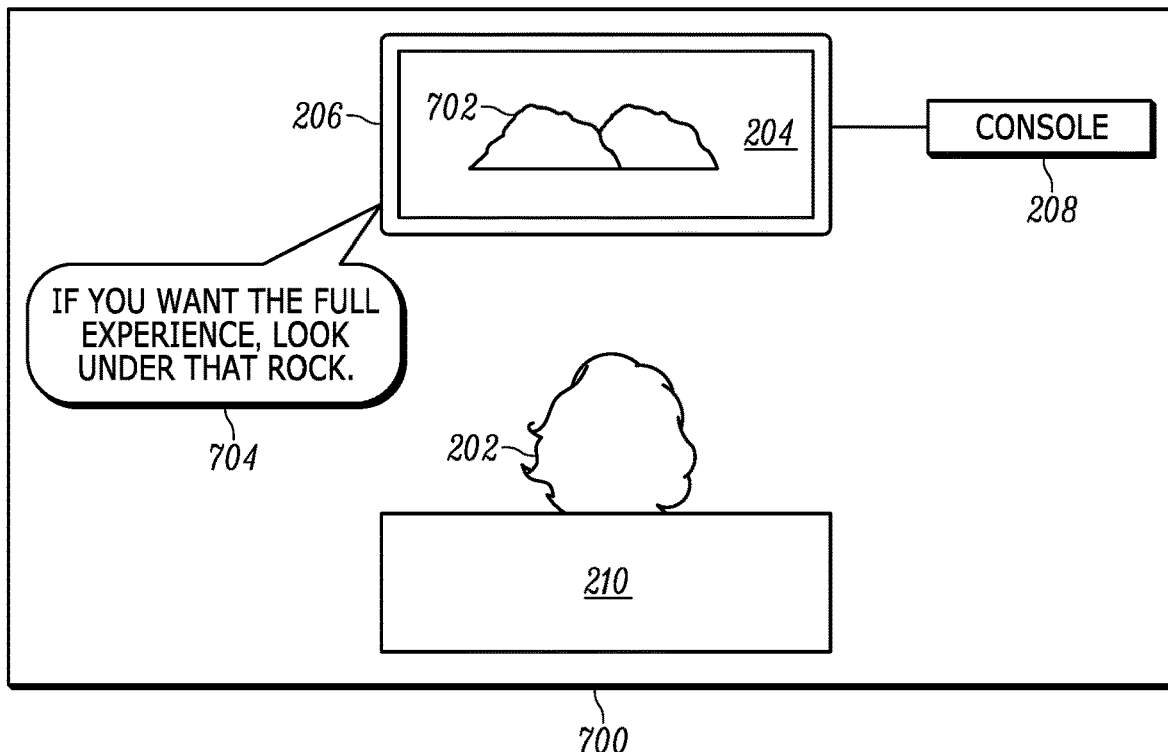

FIG. 7 shows yet another example illustration 700 in accordance with present principles. As shown, the player 202 is still playing the video game 204. But now a rock or boulder 702 is being presented as part of the video game 204 at a particular location within the video game. The location may be, e.g., at a particular sub-chapter of the game such as a chapter beginning segment, chapter middle segment, or chapter end segment. The audible assistant application may identify the rock/boulder 702 by analyzing a frame buffer of the video game 204 provided by the console 208 to identify the object as a rock/boulder known to be disposed within a certain section of the video game. Additionally or alternatively, camera input and object recognition may be used to identify the rock/boulder 702 similar to as described above in reference to FIG. 2 for the zombie 214. Also, an application programming interface (API) provided with the video game 204 by the video game producer and executing at the console 208 as part of the video game 204 may provide data indicating the rock/boulder 702, a location within the video game at which the rock/boulder 702 appears, and a video game feature associated with the rock/boulder 702. For example, the feature associated with the rock/boulder 702 may be a zombie-killing weapon that is hidden under the rock/boulder 702.

Thus, after having identified the rock/bounder 702 and the associated feature via the API or via other data to which the audible assistant application has access, the audible assistant application may provide audible assistance to the player 202 that encourages the player 202 to look under the rock using the video game character being controlled by the player 202 in order to get the "full experience" of the video game. This is indicated by speech bubble 704. The application may have tailored this audible assistance based on a setting for the application that has been turned on for providing the player 202 with the "full experience", such as providing assistance that helps the player 202 engage with various aspects of the video game that may not be critical or necessary to finishing or beating the video game but that still enhance gameplay and entertainment. Additionally or alternatively, machine learning may be used be used to determine that the player 202 wants the "full experience" and/or the assistant application may determine as much based on receiving a voice command from the player 202 requesting that assistance be provided to help the player 202 have the "full experience".

Figure 8:
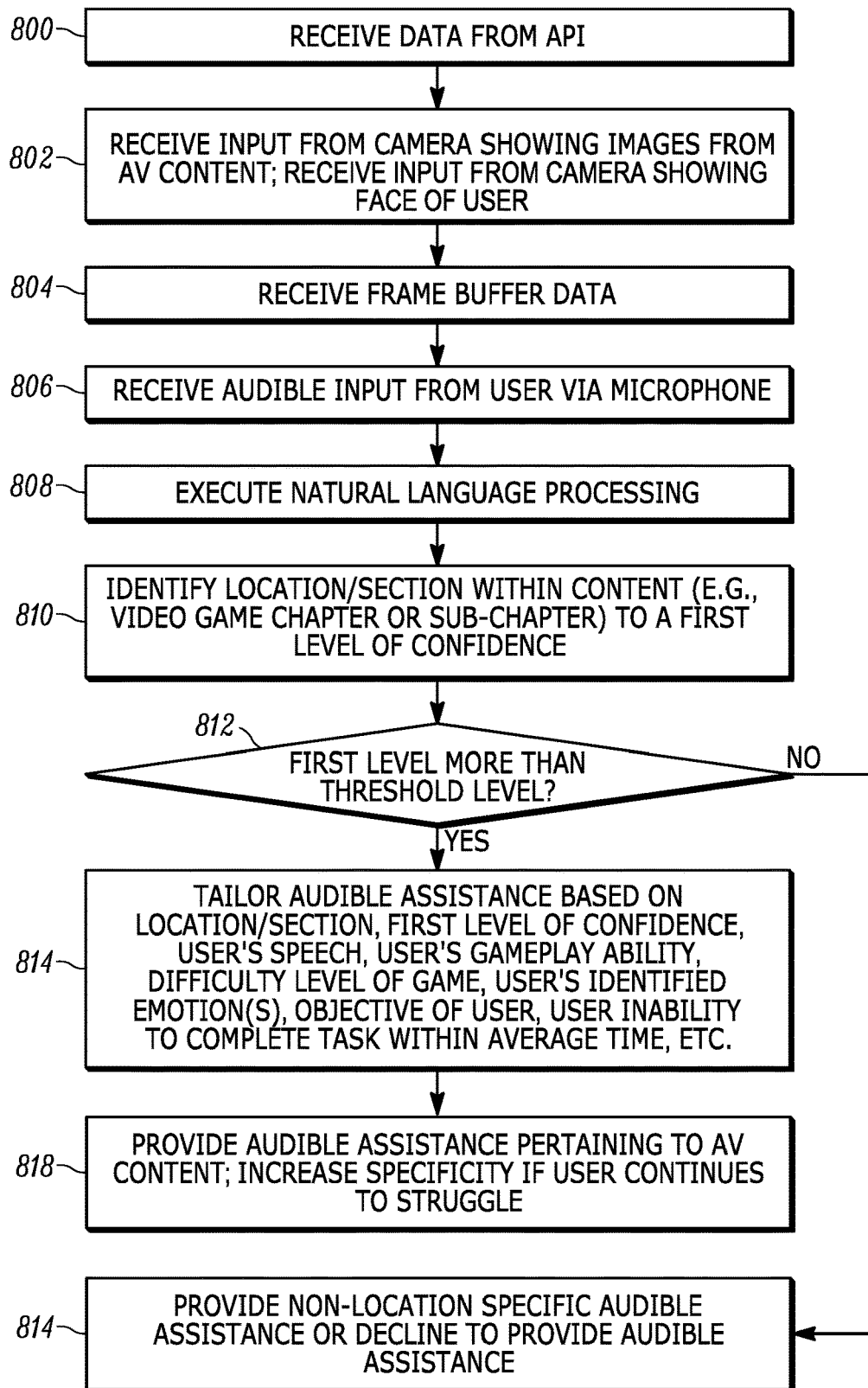
FIGS. 8 and 9 are flow charts of example logic consistent with present principles.

Continuing the detailed description in reference to FIG. 8, it shows a flow chart of example overall logic consistent with present principles that may be executed by a device as part of an audible/digital assistant application, whether the application is executing in a stand-alone robot such as the robot 216 or is being executed by another device within a network of devices being used to undertake present principles. Beginning at block 800, the device may receive data from an API for audio video (AV) content such as a video game. The API may be running on a video game console and developed by the provider of the video game. The API may indicate a location/segment within the AV content that is currently being presented as well as, e.g., how successful a user has been at playing the video game, which in turn can be used to tailor audible output in accordance with present principles. For example, a producer of the AV content and accompanying API may program the API with known average times to complete a given chapter or task within a video game as determined based on sample gameplay data/training by video game testing people. The API may then, while the user plays the video game, may compare the user's time for completing a given chapter/task to the average time to determine whether the user is doing better than average, average, or worse than average.

Then logic may then move to block 802 where the device may receive input from one or more cameras on or otherwise in communication with the device. Input from one such camera may show partial or full images of frames of the AV content as presented on an AVD while input from another camera oriented to image the user's face may also be received to perform emotion recognition using the input to thus identify an emotion of the user in accordance with present principles.

The logic may then proceed to block 804 where the device may receive frame buffer data from a source of the AV content, such as a video game console. In some embodiments the frame buffer data may be used to identify the location/segment within the AV content that is currently being presented. Thus, the frame buffer data may indicate image frames of the video portion of the AV content so that the location/segment may be identified, and/or the frame buffer data may itself indicate location information for the location/segment currently being presented.

From block 804 the logic may then proceed to block 806 where the device may receive audible input from the user via a microphone on or otherwise in communication with the device. As described herein, this input may be used for a variety of purposes, such as identifying a location/segment within the AV content, identifying natural language for which assistance related to the AV content may be provided, identifying an emotion of the user, etc.

Thereafter the logic may proceed to block 808. At block 808 the device may execute natural language processing on the user's speech as received via the microphone input at block 806 in order to identify, e.g., the current location/segment within the AV content as well as parameters from the speech that may be used for tailoring audible assistance for the user as set forth herein.

From block 808 the logic may proceed to block 810. At block 810 the device may identify the location/section within the AV content to a first level of confidence based on one or more of the inputs/data received at blocks 800-806. For example, the device may identify the location/section based on objects in the foreground or background of a video game scene as indicated in images showing the video portion of the AV content. The first level of confidence itself may be determined using an estimation model such as a fuzzy logic algorithm, neural network model, and/or a Bayesian statistics model. Artificial intelligence software may also be used.

The logic may then proceed to decision diamond 812 where the device may determine whether the first level of confidence with which the device has identified the location/section is at or above a threshold level of confidence that may be predefined by a provider of the audible assistant application. Responsive to a negative determination at diamond 812, the logic may proceed to block 814 where the device may provide non-location-specific audible assistance such as general words of encouragement (e.g., "You're doing good, keep playing the game!") or decline to provide any audible assistance at all.

However, responsive to an affirmative determination at diamond 812 the logic may instead proceed to block 816. At block 816 the device may tailor audible assistance based on the identified location/section within the AV content. In some embodiments, the audible assistance may also be tailored based on the first level of confidence with e.g., more specific or descriptive assistance being provided the higher the level of confidence in the identification of the location. The audible assistance may also be tailored based on other factors as set forth herein, such as a user's natural language speech, a user's gameplay ability, a particular difficulty level at which the video game has been set (e.g., beginner, intermediate, expert), a user's identified emotions, one or more identified objectives of the user, the user's ability to complete a given video game task within an average time, etc.

Furthermore, a confidence level in the tailored output may also be evaluated by the device in some embodiments. For instance, if the device generates audible assistance having certain information, but then the device determines that this audible assistance cannot be determined to be appropriate or relevant to at least a threshold confidence level, then the device may generate more-general assistance and again evaluate whether that more-general assistance is appropriate to at least the threshold confidence level. Then once this confidence level has been met, the logic may proceed to block 818. At block 818 the device may provide the audible assistance pertaining to the AV content, such as over a speaker on a stand-alone robot, a speaker on a television being used to present the AV content, the speaker of the user's smart phone, etc.

Figure 9:
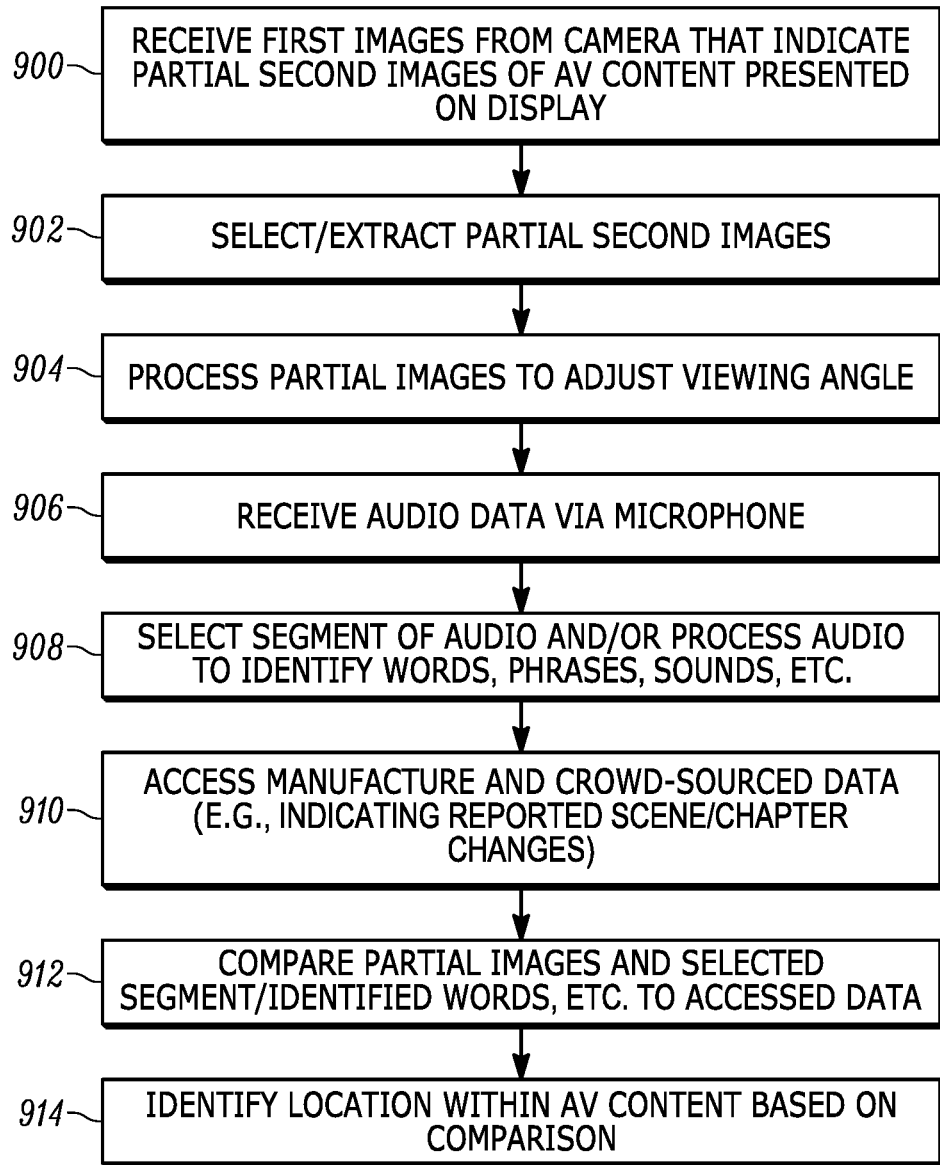

Now in reference to FIG. 9, another flow chart is shown of example logic that may be executed by a device in accordance with present principles. The logic of FIG. 9 may be executed by a device executing an audible assistant application in accordance with present principles to identify a location/segment within AV content based on a user's speech as well as input from a camera that is imaging a display on which video of the AV content is presented. For the example to be described in reference to FIG. 9, it is to be assumed that the centerline axis of the field of view of the camera is not orthogonal to the display itself but is offset at an oblique angle.

It is to also be assumed that sunlight is reflecting off of the display at an angle that interferes with the camera such that images generated by the camera show only partial visual images of frames of the video content currently being presented on the display. For example, the glare from the sunlight may result in video frames presented on a left half of the display being represented in the input from the camera while a right half of the same video frames as presented on the right half of the display are not shown in the camera input owing to the glare obstructing their view.

In any case, the logic of FIG. 9 begins at block 900 where the device may receive first images from the camera that indicate partial second images of the AV content itself as presented on the display. The logic may then proceed to block 902 where the device may select or extract the partial second images from the first images using image-processing software.

After block 902 the logic may proceed to block 904. At block 904 the device may process the partial second images using the image processing software to alter the partial second images as extracted in order to show the video frames indicated in the second images from the perspective of a viewing angle/axis that is orthogonal to the display on which the AV content is presented. In other words, the device may "warp" the images to change the viewing angle so that a more accurate comparison to one or more training or reference images may be made in order to identify a location of the AV content.

The logic of FIG. 9 may then proceed to block 906, where the device may receive audio data via a microphone on or otherwise in communication with the device. The audio data may indicate natural language speech of the user or audio of the AV content itself. Then at block 908 the device may select a segment of the received audio data to identify words, phrases, or sounds from the user or AV content.

From block 908 the logic may proceed to block 910 where the device may access data from a manufacturer of the device or manufacturer of a particular video game console being used to present the AV content. Additionally or alternatively, at block 910 the device may access crowd-sourced data stored by the manufacturer once crowdsourced or otherwise stored at a storage location accessible to the device. The data itself may indicate scene or chapter changes within the AV content and associated images associated with before or after the change, as well as key words or sounds in the AV content from before or after the change, as reported by the manufacturer or other users in the case of crowd-sourced data. The associated images, key words, or sounds may then be compared to the partial images and/or selected audio segment at block 912 to then identify a location within the AV content at block 914 based the partial images/selected audio segment being matched to a given location indicated in the data.

Though not shown in FIG. 9, in some embodiments the device may undertake additional steps after block 914. For instance, once a game location is identified from a selected segment of audio of the AV content or from the partial second images, the device undertaking the logic of FIG. 9 may report association of that audio/partial image frames with a particular location within the AV content to other devices across the world that are also executing their own instances of the audible assistant application to help those applications make similar location determinations. The device undertaking the logic of FIG. 9 may even abstract out where scenes of the AV content are changing and report that to other audible assistant applications too.

Figure 10:
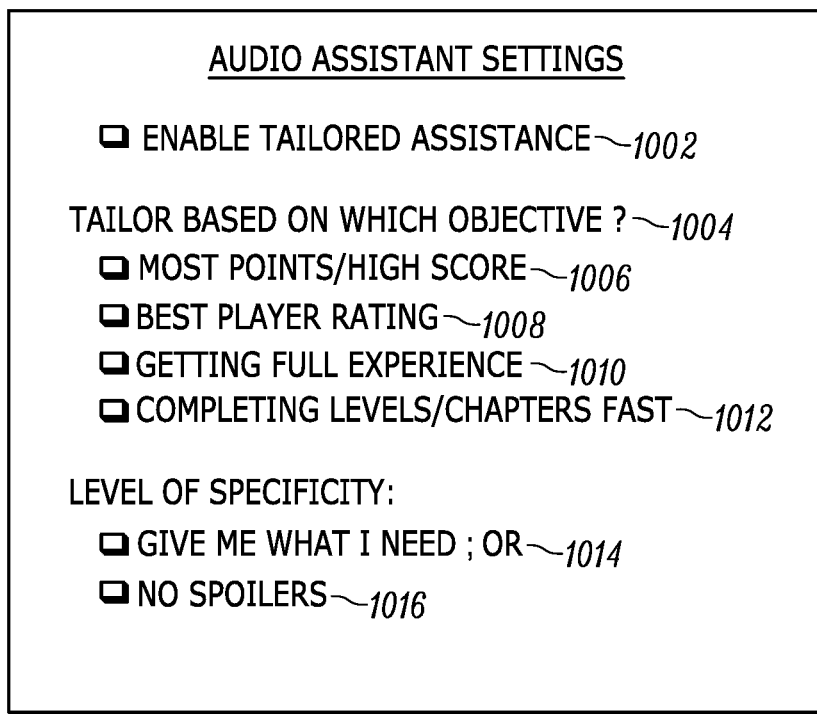
FIG. 10 shows an example graphical user interface consistent with present principles.

Reference is now made to FIG. 10, which shows an example graphical user interface (GUI) 1000 that may be presented on a display accessible to a device undertaking present principles. The GUI 1000 may be used to configure settings of the device and/or an audible assistant application undertaking present principles. Furthermore, it is to be understood that each of the options or sub-options to be discussed below may be selected by directing touch or cursor input to the adjacent check box shown for each respective option.

As shown in FIG. 10, the GUI 1000 may include a first option 1002 that is selectable to enable tailored audible assistance as described herein. For example, selection of the option 1002 may configure the device/application to undertake the functions and routines described herein, such as the logic of FIGS. 8 and 9.

The GUI 1000 may also include an option 1004 with respective sub-options 1006-1012 that are selectable for a user to provide input of the user's objective(s) while playing a video game so that the device/application may tailor audible output/assistance to providing information that helps the user achieve his or her specific objective(s). As shown, the sub-options 1006-1012 are respectively for tailoring the output based on the user achieving the most points possible or achieving a new high score for the video game, achieving a best player rating for the video game, getting the "full experience" of the video game, and completing various video game levels or chapters as fast as possible (e.g., even if not getting maximum points from each level/chapter).

Still further, the GUI 1000 may present an option 1014 that is selectable to configure the device/application to give specific and explicit audible assistance describing how the user may achieve his or her objective(s), while an option 1016 may instead be selected to configure the device/application to give more-general hints to help the user achieve his or her objective(s) without giving spoilers of upcoming features of the video game or ruining the suspense of how to "unlock" or accomplish something in the video game.

Providing additional disclosure in accordance with present principles, it is to be understood that APIs conforming to a video game console manufacturer's standards as indicated in a technology requirement checklist (TRC) may be provided as part of a video game by the video game's producer. However, non-conforming APIs may still be used such as, e.g., in embodiments where artificial intelligence software may be used to process input from the non-conforming API to identify an AV content location, relevant audible assistance to provide, etc.

As far as audible output/assistance goes, it is to be further understood that sometimes the output may include sarcastic or humorous comments to a user. An artificial intelligence system (AI) or deep learning module may be used to determine if sarcasm or humor is appropriate, and in fact an AI system or deep learning module may be used as part of the audible assistant application disclosed herein in order to make any of the determinations or identifications discussed herein as well as to tailor any audible output/assistance that is to be provided based on the AI system/module determining the output/assistance is relevant based on various factors as discussed herein. For example, an AI system employed to undertake present principles can analyze a single image frame of AV content to identify a location/segment within the AV content that is currently being presented, or the AI system may instead analyze, e.g., a three to five second span of image frames.

Regarding the audible assistant applications/devices disclosed herein, whether or not executed by an AI system, it is to be understood the assistant may be programmed to know how precise it should be in providing audible assistance. For example, a video game provider or video game console manufacturer may customize the assistant or provide customized data for use by the assistant based on a particular video game or other type of AV content for which audible output is to be provided. Additionally or alternatively, the assistant may be trained to customize its output dynamically based on, e.g., user feedback about whether the output was good or bad.

Regarding using identification of a given object within image frames of AV content in order to identify a location/ segment of the AV content being presented, object or asset identifications (IDs) may be used as associated with various locations within the AV content. Furthermore, the assistant may be trained to recognize a given object from all angles should one video game player control the video game to view the object from one angle while another video game player controls the same video game to view the object from a different angle.

Furthermore, it is to be understood in accordance with present principles that audible assistance/output may be provided for other types of AV content besides video games. For instance, if a user is watching a movie or television show and wonders aloud what actor or actress is playing a particular character, a device undertaking present principles may process the user's speech using natural language processing to tailor an audible output that identifies the actor or actress.

Still regarding tailored audible outputs, in addition to what is disclosed above, these outputs may be determined still other ways. For example, a provider of a given video game may provide a list of game actions a user is to take or goals a user is to accomplish and at what points in the game those actions/goals arise, and then a given audible output may be tailored to indicate the action or goal to be accomplished as indicated on that list once the associated location is reached. The list may even have various "hints" of different levels of specificity, with more general hints being provided and more specific hints then being provided if, e.g., a user still struggles to accomplish a certain goal even after receiving the more-general hint. The hints themselves may be pre-programmed by a video game console manufacturer or video game producer in still other ways and associated with various sections of the video game, and then such a hint may be selected for presentation to the user once an associated section of the video game has been reached. What's more, hints may be crowdsourced based on difficulties video game players at other locations have had or information/ hints those players have requested in the past even if, e.g., provided in natural language rather than as voice command input. Still further, various players of a video game may post questions or requests for hints to an online forum or help system, and then the console manufacturer or video game producer may select a best answer or provide its own and program that as a "hint" to be audibly provided by an audible assistant undertaking present principles.

As another example, for major tasks of a video game (e.g., those for which a player cannot advance from one chapter to another without accomplishing the task), a console manufacturer or video game provider may specify specific, tailored outputs that are to be provided when a user requests assistance or when such assistance is determined to be relevant based on a user's natural language. Then for other "smaller" tasks, machine learning may be used to identify and select an appropriate tailored response.

Still further, for identifying a segment/location within AV content that is a video game specifically, in addition to using camera images, frame buffers, etc. as described above, identification of a video game player executing a particular skill move of a predetermined button-press/joystick combination using a video game controller may also be used to identify the location. This may be accomplished owing to various button-press/joystick combinations being built in to the video game so that the player learns them at various different stages of the video game. Hence, if a combination that a player will not learn or discover until a later chapter of a video game is identified, a device undertaking present principles may determined that the current location of the video game must be at least at that later chapter. These combinations may also be used to identify a user's gameplay ability or the difficulty level at which a video game has been set as described above so that more general hints can be provided for more advanced players and higher difficulty levels, while more specific hints can be provided for less advanced players and lower difficulty levels, e.g., as programmed or predefined by a manufacturer or video game provider.

As may be appreciated from the foregoing detailed description, present principles thus improve the functionality and ease of use the devices described herein and also improve the digital assistants those devices may execute through the technological solutions described herein.

It will be appreciated that whilst present principals have been described with reference to some example embodiments, these are not intended to be limiting, and that various alternative arrangements may be used to implement the subject matter claimed herein.

What is claimed is:
1. A device, comprising:
at least one processor configured with instructions executable to:
identify a location within audio video (AV) content that is currently being presented;
identify an aspect of the location; and
provide, based on the identification of the location within the AV content, audible assistance pertaining to the AV content, wherein content of the audible assistance is first content responsive to the aspect being a first aspect and content of the audible assistance is second content responsive to the aspect being a second aspect, the second content being further responsive to a confidence in correctly identifying the second aspect, or a confidence in correctly identifying the location, or both a confidence in correctly identifying the second aspect and the location.

2. The device of claim 1, wherein the AV content comprises a video game, and wherein the location comprises one of: a chapter of the video game, a sub-chapter of the video game.

3. The device of claim 1, wherein the location is identified based at least in part on images from a camera in communication with the at least one processor, the images from the camera indicating a portion of the AV content.

4. The device of claim 1, wherein the audible assistance is first audible assistance, wherein the location is a first location, and wherein the instructions are executable by the at least one processor to:
provide the first audible assistance based on the identification of the first location meeting a threshold confidence level; and
decline to provide second audible assistance based on an identification of a second location within the AV content not meeting the threshold confidence level.

5. The device of claim 1, wherein the content of the audible assistance is tailored to pertain to the location based on a level of confidence in the identification of the location being above a threshold confidence level, and wherein the content of the audible assistance is not tailored to pertain to the location based on the level of confidence in the identification of the location being below the threshold confidence level.

6. The device of claim 1, wherein the content of the audible assistance is determined based on execution of natural language processing on speech received from a user to identify information relevant to what is spoken by the user, the speech being received via a microphone in communication with the at least one processor.

7. The device of claim 1, wherein the content of the audible assistance is tailored to a user's emotion(s) while observing the AV content, the emotion(s) being identified by the at least one processor.

8. The device of claim 1, wherein the AV content comprises a video game, and wherein the content of the audible assistance is tailored to at least one of: a player's gameplay ability, a difficulty level at which the video game is set.

9. The device of claim 1, wherein the AV content comprises a video game, and wherein the content of the audible assistance varies based on an objective of a player, the objective identified by the at least one processor, the objective pertaining to one or more of: a game score, a player rating, a level of engagement with various aspects of the video game, completing the video game.

10. The device of claim 1, wherein the device is a first device, and wherein the first device comprises a robot that is different from a second device at which the AV content is presented.

11. The device of claim 1, wherein the device at least one of: is embodied in a video game console, communicates with the video game console to identify the location.

12. The device of claim 1, wherein the second aspect comprises at least one object different from objects in the first aspect and not in the first aspect.

* * * * *